March 31, 1970   E. R. DUNN   3,503,155

DISC GRINDER LOADER AND CARRIER ASSEMBLY

Filed Sept. 15, 1967   5 Sheets-Sheet 1

INVENTOR
ELMAN R. DUNN

BY
Mason, Porter, Diller & Brown
ATTORNEYS

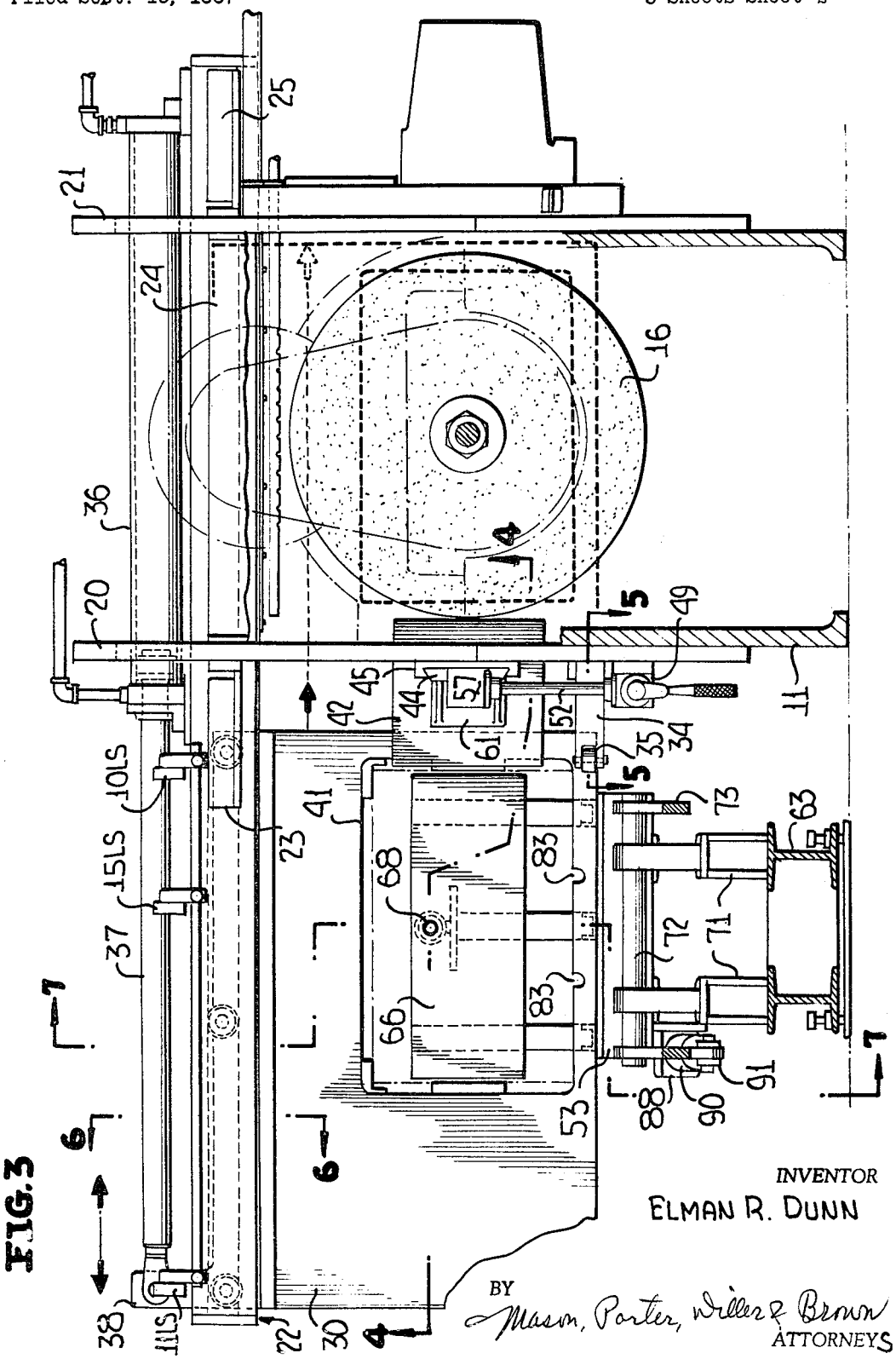

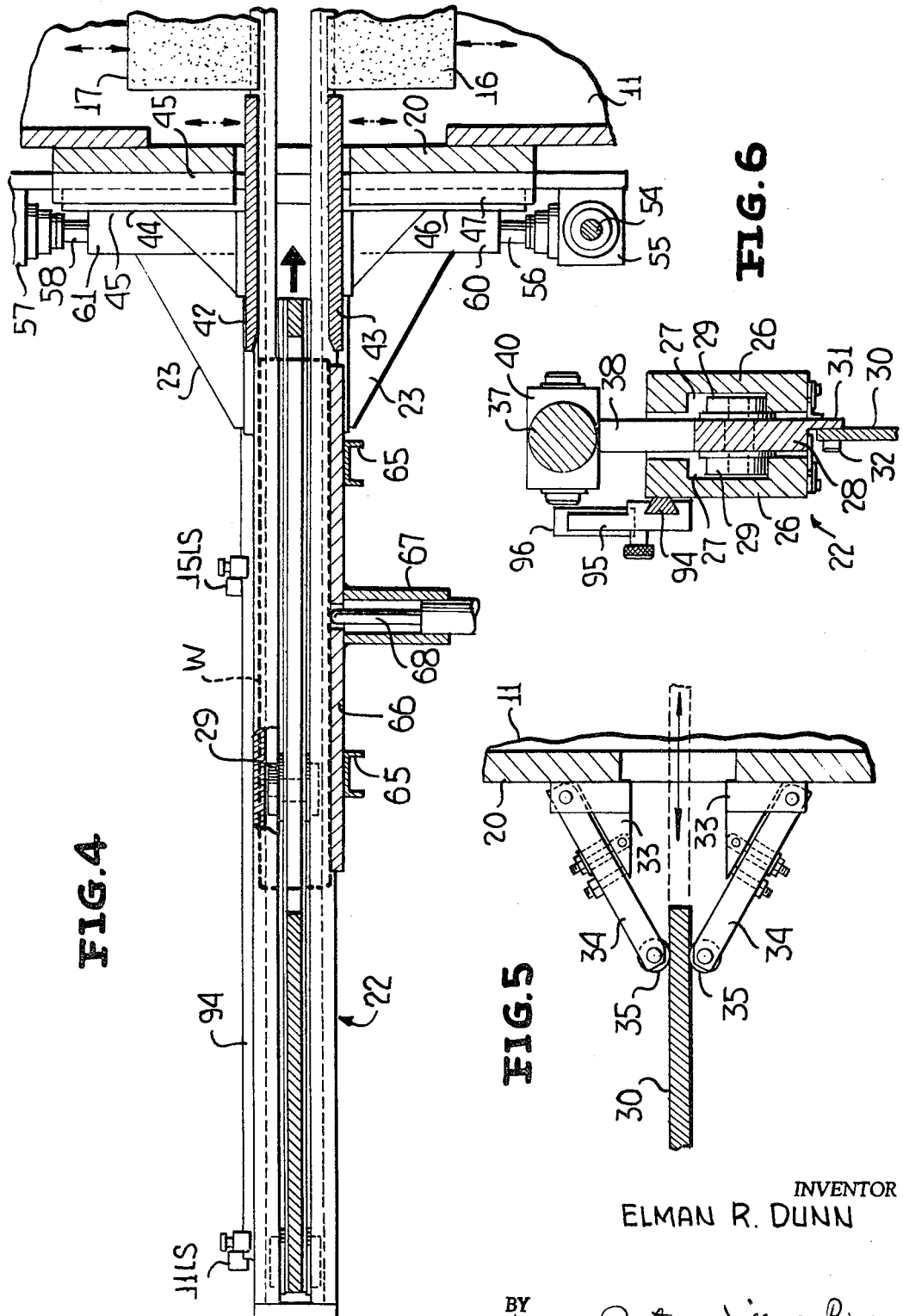

March 31, 1970  E. R. DUNN  3,503,155

DISC GRINDER LOADER AND CARRIER ASSEMBLY

Filed Sept. 15, 1967  5 Sheets-Sheet 4

INVENTOR
ELMAN R. DUNN

BY Mason, Porter, Diller & Brown
ATTORNEYS

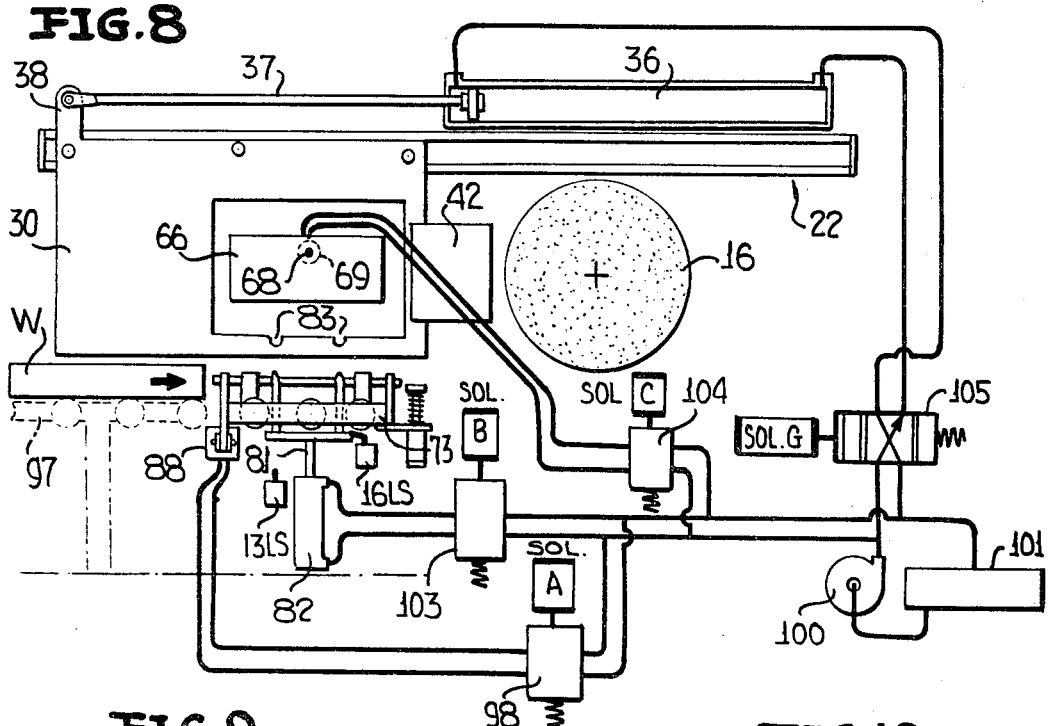
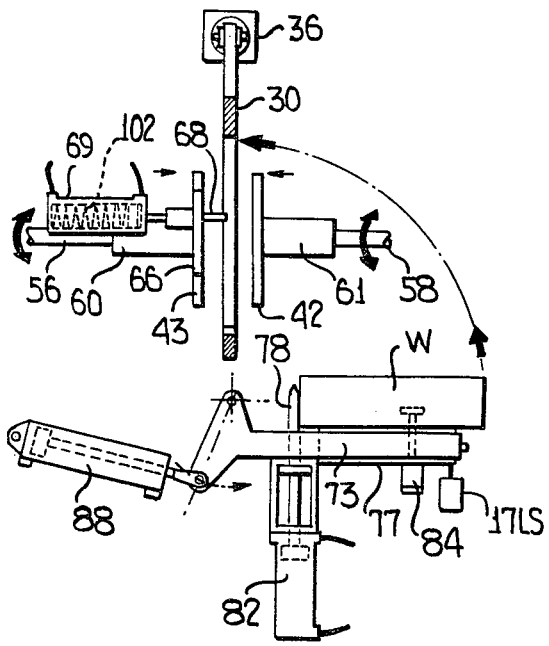
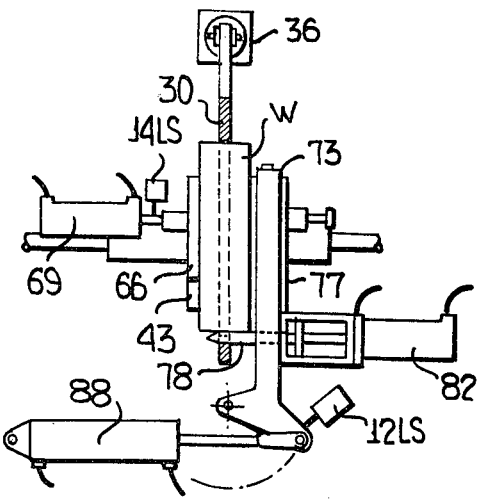

United States Patent Office 3,503,155
Patented Mar. 31, 1970

3,503,155
DISC GRINDER LOADER AND CARRIER ASSEMBLY
Elman R. Dunn, Roscoe, Ill., assignor to Landis Tool Company, Waynesboro, Pa., a corporation of Pennsylvania
Filed Sept. 15, 1967, Ser. No. 668,039
Int. Cl. B24b 47/02
U.S. Cl. 51—114                                                14 Claims

ABSTRACT OF THE DISCLOSURE

The disclosure of this application relates to horizontal double spindle disc grinders of the type in which the workpieces are inserted between the discs for a grinding operation and removed therefrom by means of a reciprocating member known as a gun-type carrier. In accordance with this disclosure, the reciprocating member is attached to a carriage on an overhead track and moved into and out of the grinding zone preferably by means of a hydraulic motor. Guide rollers engage the sides of the reciprocating member adjacent the bottom thereof to align it with the abrasive disc. The overhead track is supported by a pair of inverted U-shaped members mounted on the front and rear portions of the machine. A work inserting member or loader is pivotally mounted underneath and transversely of the gun-type carrier. The work inserting member is operable when the carrier is in a retracted position to remove a ground workpiece and insert an unground workpiece.

---

This invention relates to improvements both in the loading of gun-type carriers of horizontal double spindle disc grinders and in the suspension of the gun-type carriers. Disc grinders of this general type include a bed on which there are mounted left-hand and right-hand disc assemblies between which workpieces are moved during a grinding operation. The workpieces are carried by a gun-type carrier which reciprocates between the two discs. In the past, the gun-type carrier has been supported at the bottom thereof in a suitable trackway. However, this has two deficiencies. In the first place, during a grinding operation a coolant is appleid to the workpiece surfaces and the coolant, as well as the removed stock and eroded surface particles of the discs flow downwardly and interfere with the free operation of the carrier. At the same time, the bottom support of the carrier interferes with a free discharge of coolant. Secondly, because of the supporting of the carrier from the bottom thereof, the support for the carrier has been in the way of the loading mechanism.

In accordance with this invention, the mounting of the gun-type carrier has been simplified by the mounting of an overhead track on the bed of the grinder generally in alignment with the space between the faces of the discs. The overhead track is carried by a pair of upstanding bridge plates which are secured to the front and rear of the bed. This provides a stable and trouble-free simple beam support for the combined dead weight load of the carrier and the workpiece. In addition, it will be readily apparent that the carrier may be supported in a manner wherein the support mechanism is free of the usual coolant and the materials carried thereby.

In accordance with this invention, the overhead beam is in the form of a double track arrangement having sets of rollers mounted therein. The rollers are carried by a carriage. The work carrying member or work paddle is releaseably secured to the carriage for movement therewith.

The reciprocation of the carrier is effected by means of a simple driving unit in the form of a fluid cylinder mounted in overlying relation to the track and having the piston rod thereof directly secured to the carriage.

In addition to the advantageous supporting of the carrier, the front and rear bridge plates provide an overhead tie support for the machine base or bed walls to help the bed resist the deflecting forces of grinding pressures between the opposed abrasive disc faces.

A further feature of this invention is the provision of a novel loader mechanism for loading workpieces into the work paddle and removing the same therefrom. Due to the overhead mounting of the carrier, the loader assembly may extend beneath the carrier and may operate in an efficient manner.

The loader assembly of this invention includes a work support which is pivotable from a generally horizontal position to an upstanding position alongside the work carrier. The work support is provided with a plurality of projecting members which support the workpiece as the work support approaches a vertical position and which are retractable to lower the workpiece onto the work carrier.

In accordance with this invention, the projecting members are wedgeable in between the work carrier and the workpiece so as to elevate the workpiece to facilitate the removal thereof from the carrier. There are also provided means for automatically pushing the workpiece out of the work carrier as the work support is being lowered to assure the proper removal of the workpiece from the carrier.

With the above and other objects in view that will hereinafter appear, the nature of the invention will be more clearly understood by reference to the following detailed description, the appended claims and the several views illustrated in the accompanying drawings:

In the drawings:

FIGURE 3 is an enlarged fragmentary sectional view taken along the line 3—3 of FIGURE 1 immediately to one side of the carrier.

FIGURE 4 is an enlarged fragmentary horizontal sectional view taken generally along the line 4—4 of FIGURE 3 and shows the further details of the carrier and the position of a workpiece mounted therein.

FIGURE 5 is a fragmentary horizontal sectional view taken along the line 5—5 of FIGURE 3 and shows the manner in which the lower portion of the carrier is guided.

FIGURE 6 is an enlarged fragmentary vertical sectional view taken transversely through the upper portion of the carrier and shows the general details thereof.

FIGURE 8 is a schematic elevational view showing the general details of the carrier and loader assemblies.

FIGURE 9 is a schematic elevational view with the carrier in section showing the general sequence of operation of the loader.

FIGURE 10 is a view similar to FIGURE 9 showing the workpiece positioned within the carrier by the loader.

Figure 1:
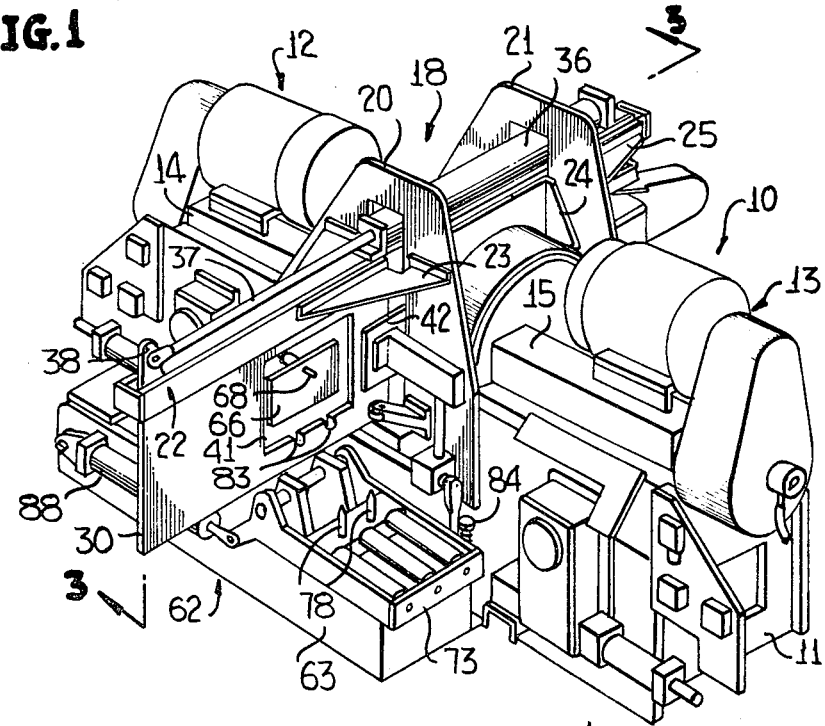
FIGURE 1 is a front perspective view of a disc grinder formed in accordance with this invention.
Figure 7:
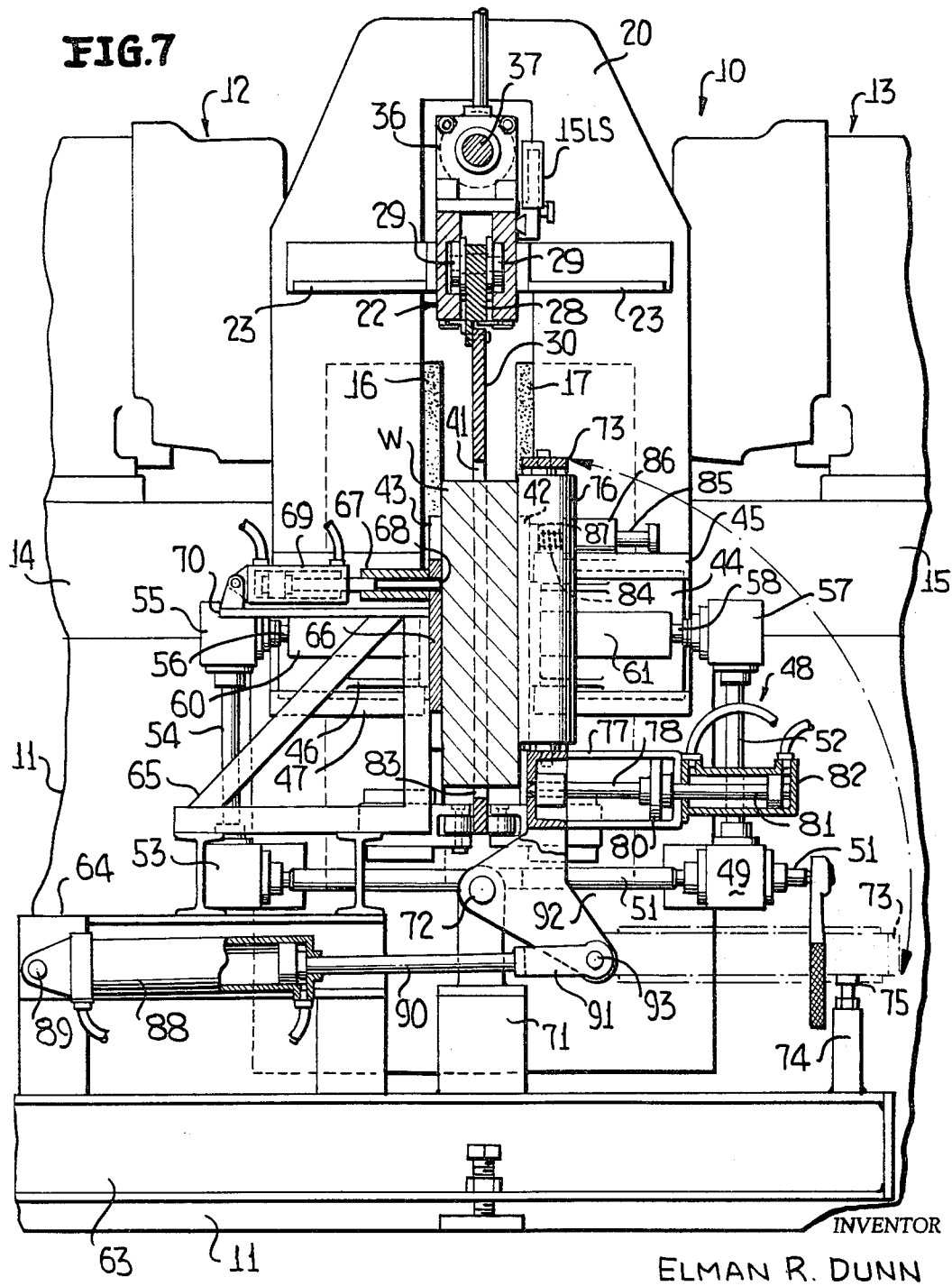
FIGURE 7 is an enlarged fragmentary vertical sectional view transversely through the carrier in the area of the loader assembly and shows specifically the details thereof, the view being taken along the line 7—7 of FIGURE 3.

Referring now to the drawings in detail, it will be seen that there is illustrated in FIGURE 1 a disc grinder constructed in accordance with this invention, the disc grinder being generally referred to by the numeral 10. Basically the disc grinder 10 is of a conventional construction except for the work carrier and work loader thereof. The disc grinder 10 includes an elongated bed 11 having mounted on the opposite ends thereof in opposed relation a pair of grinding disc assemblies 12 and 13 which are mounted on the bed 11 by means of slides 14 and 15, respectively. With particular reference to FIGURES 4 and 7, it will be seen that the grinding disc assembly 12 includes an abrasive disc 16 while the grinding disc assembly 13 includes an abrasive disc 17. The faces of the discs 16 and 17 are disposed in opposed relation and are adapted to simultaneously grind opposite faces of a workpiece, such as the workpiece W.

At this time, it is pointed out that the disc grinder 10 is provided with automatic controls which will position the abrasive discs 16 and 17 relative to one another and which will automatically advance and retract the abrasive discs in accordance with the necessary grinding operation.

WORK CARRIER

In accordance with this invention, the disc grinder 10 is provided with a work carrier assembly of the gun-type, the work carrier assembly being generally referred to by the numeral 18. The work carrier assembly 18 includes a pair of bridge plates 20 and 21 which are secured to the front and rear side walls, respectively, of the base or bed 11. The bridge plates 20 and 21 are generally of an inverted U-shaped outline and are disposed in upright positions in alignment with the space between the assemblies 12 and 13.

A horizontal track unit, which is generally referred to by the numeral 22 extends through the upper portions of the bridge plates 20, 21 in overlying alignment with the space between the abrasive discs 16, 17. It is to be noted that the track unit 22 extends a considerable distance in front of the bed 11 while it extends only a relatively short distance to the rear of the bed 11. However, this is subject to modification as will be pointed out hereinafter. The track unit 22 is rigidly supported from the bridge plates 20, 21 by means of suitable brackets, such as the brackets 23, 24 and 25. It is to be understood that the track unit 22, together with the bridge plates 20, 21 provides an overhead tie support for the bed walls, thereby helping the bed 11 resist the deflecting forces of grinding pressures between the opposed abrasive disc faces. This adds to inherent base rigidity.

Referring now to FIGURE 6 in particular, it will be seen that the track unit 22 is formed of a pair of opposed, but spaced apart track members 26. The track members 26 are of a generally channel shaped section and provide guideways 27 which are disposed in opposed spaced relation.

An elongated carriage 28 is positioned between the track members 26 and is supported thereby in guided relation by sets of rollers 29 which ride within the guideways 27. The carriage 28 has suspended therefrom a paddle or carrier 30 which is releasably secured to a depending extension 31 on the carriage 28 by means of fasteners 32. It is to be understood that the carrier 30 is centered relative to the faces of the abrasive discs 16 and 17.

Referring now to FIGURES 1 and 5, it will be seen that the lower forward portion of the bridge plate 20 is provided with a pair of mounting brackets 33 which are disposed on opposite sides of the carrier 30. Each mounting bracket 33 has adjustably secured thereto a support arm 34 which extends generally forwardly therefrom, the support arms 34 being in converging relation. The forward ends of the support arms 34 are provided with suitable rollers or followers 35 which engage the lower portion of the carrier 30 and serve to maintain the carrier 30 in proper alignment with the abrasive discs 16 and 17. If desired, similar guide means may be provided on the rear surface of the rear bridge plate 21.

In order to effect the reciprocation of the carrier 30 between the abrasive discs 16, 17, there is provided means for driving the carrier 30 which is preferably in the form of an elongated fluid motor or cylinder 36 which is mounted on top of the track unit 22 and which extends through the bridge plates 20, 21. The cylinder 36 is provided with a piston rod 37 which is connected to an upstanding extension 38 on the forward end of the carriage 28. It is to be noted that the piston rod 37 is provided with a bifurcated fitting 40 which engages around the extension 38.

It will be understood at this time that although at the present an extensible fluid cylinder 36 is preferred as the means for driving the carrier 30, other types of drive means may be utilized including a race and pinion type drive. Accordingly, the drive means may be mounted to one side of the track unit 22 as opposed to being supported directly thereon in overlying relation thereto.

It is to be noted that the carrier 30 has an opening 41 in which the workpiece W is positioned. It is to be understood that the carrier 30 may be provided with suitable locating members, etc. (not shown), which will be utilized to accurately position a workpiece within the carrier and to facilitate the proper supporting thereof as the carrier feeds the workpiece between the abrasive discs 16 and 17.

In order to assure the proper alignment of the workpiece W with the abrasive discs 16 and 17, there is carried by the front bridge plate 20 a pair of opposed guide plates 42, 43, as is best shown in FIGURE 4. The guide plate 42 is carried by a slide 44 which, in turn, is guidingly mounted within a guideway 45 rigidly carried by the bridge plate 20. In a like manner, the guide plate 43 is carried by a slide 46 which is guidingly mounted within a guideway 47 rigidly carried by the bridge plate 20.

The guide plates 42, 43 are simultaneously adjustably positioned by means of an adjusting mechanism which is generally referred to by the numeral 48. The adjusting mechanism 48 is carried by the bridge plate 20 and includes a gear box 49 having an input shaft 50 and a pair of output shafts 51 and 52. The shaft 51 is connected to a right angle gear box 53 which has extending vertically therefrom a shaft 54. The shaft 54 is, in turn, connected to a right angle gear box 55 which has coupled thereto a horizontal feed screw 56. The output shaft 52 is connected to a right angle gear box 57 which has coupled thereto a horizontal feed screw 58. The feed screws 56 and 58 are engaged in nut units 60 and 61 carried by the slides 46 and 44, respectively, whereby when the input shaft 50 is rotated, the guide plates 42 and 43 will be moved equal amounts in the desired direction. Thus, the guide plates 42 and 43 may be readily adjusted in accordance with the thickness of the workpiece W to be ground.

LOADER ASSEMBLY

In order to facilitate the positioning of a workpiece within the carrier 30 and the removal of a ground workpiece therefrom, there is provided a loader assembly which is generally referred to by the numeral 62. The loader assembly 62 includes a base 63 which underlies the carrier 30, as is clearly shown in FIGURE 1, and extends to opposite sides thereof.

At the left side of the carrier 30, as viewed in FIGURE 7, the base 63 includes a first frame unit 64 on which there is mounted a second frame unit 65. The frame unit 65 supports a work positioning plate 66 which is aligned with the guide plate 43. It is to be understood that the frame unit 65 may be shifted relative to the frame unit 64 as is required to compensate for the various workpieces. In a like manner, the work positioning plate 66 may also be modified or changed.

It is to be noted that the rear portion of the work positioning plate 66 is provided with a tubular guide sleeve 67 in which there is positioned a plunger 68. The plunger is in the form of a piston rod of an extensible fluid cylinder 69 which is carried by a suitable mounting bracket 70. The plunger 68 is utilized to cushion the movement of the workpiece W against the work positioning plate 66 and to eject the workpiece from the carrier 30.

The central portion of the base 63 is provided with an upstanding support unit 71 which carries a horizontal pivot pin 72. The pivot pin 72 lies in the plane of the carrier 30 and has pivotally mounted thereon a work support 73. It is to be noted that the work support 73 is pivotable from a generally horizontal position resting upon a support 74 which may have an adjustable extension 75, to a substantially vertical position wherein a workpiece W carried thereby is clamped against the work positioning plate 66 with the workpiece within the opening 41 of the carrier 30. The work support 73 may be of any desired construction, but the illustrated form is provided with rollers 76 on which the workpiece W is positioned.

It is to be noted that at one end of the rollers 76, that is the ends of the rollers 76 which are lowermost when the work support 73 is vertical, is provided with a frame element 77 in which there is slidably positioned a plurality of pins 78 which serve both to position the workpiece and to support the workpiece as it assumes an upstanding position. The number of the pins 78 may vary, but there should be at least two of the pins 78. The pins 78 are interconnected by a holder 80 which, in turn, is connected to a piston rod 81 of an extensible fluid cylinder 82 which is mounted on the frame member 77.

At this time it is pointed out that the carrier 30, at the bottom of the opening 41, is provided with notches 83 in which the pins 78 are received. The depth of the notches 83 is slightly less than the diameter of the pins 78 so that when the pins 78 are seated in the notches 83 and the workpiece W is seated on the pins 78, the workpiece will be slightly elevated with respect to the portion of the carrier 30 defining the bottom of the opening 41. Then, as the pins 78 are withdrawn, the workpiece will be lowered onto the carrier and supported thereby. It is to be noted that the pins 78 have pointed or rounded ends whereby the pins 78 may be projected between the workpiece and the carrier in order to elevate the workpiece and facilitate the removal thereof from the carrier.

It is also to be noted that the work support 73 is provided with a stop 84 which cooperates with the pins 78 in the positioning of a workpiece on the work support 73. It is to be understood that the stop 84 must be retractable and suitable means will be provided to permit the same to be retracted. In FIGURE 7, the stop 84 is illustrated as being carried by a rod 85 which is slidably mounted in a sleeve 86 and wherein the stop 84 is normally projected to an operative position by means of a spring 87, but wherein the spring 87 is collapsible to permit the retraction of the stop 84.

In order to effect the swinging of the work support 73 between a horizontal work receiving position and a vertical work positioning position, there is provided a further extensible fluid cylinder 88 which has one end pivotally mounted on the frame unit 64 by means of a pin 89. The cylinder 88 has a piston rod 90 which is provided at the projecting end thereof with a bifurcated fitting 91 which is pivotally connected to a lever portion 92 of the work support 73 by means of a pin 93.

OPERATION

In order to facilitate the automatic operation of the disc grinder 10, there is carried by one of the track members 26 a dovetailed support member 94 on which there is adjustably clamped a plurality of support brackets 95. Each support bracket 95 carries a limit switch 96. In FIGURE 3 it will be seen that there are three of these limit switches, which limit switches are identified as limit switches 11LS, 15LS and 10LS. It is to be understood that there are other limit switches which will be described hereinafter in detail.

Figure 2:
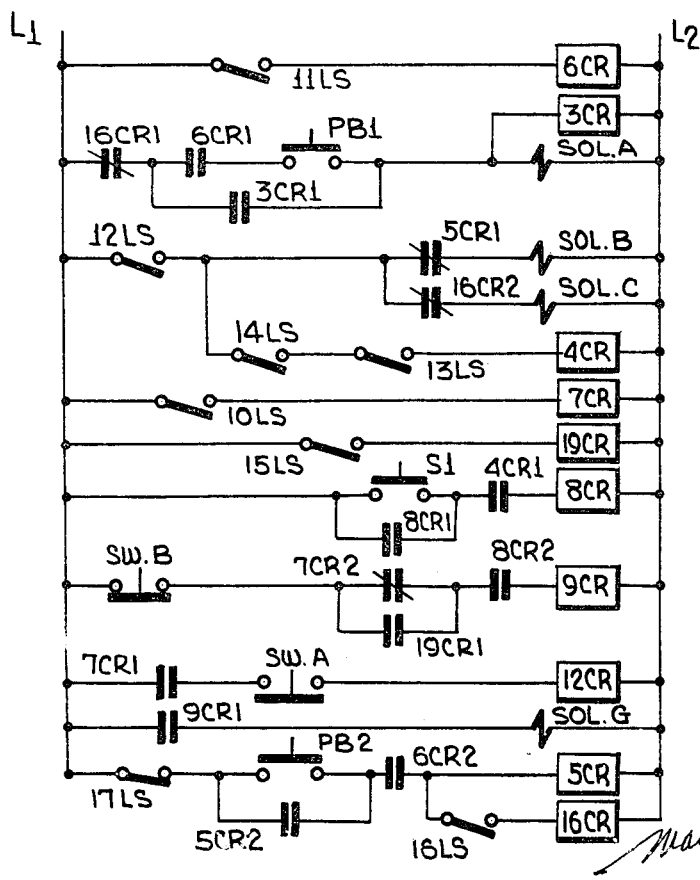
FIGURE 2 is a wiring diagram of the components of the disc grinder to which this invention relates.

Reference is now made to the wiring schematic of FIGURE 2 and the schematic shown in FIGURE 8. The workpiece W is delivered to the work support or table 73 along a roller conveyor, such as the roller conveyor 97, or by any other method. The workpiece is positioned on the work support 73 by means of the pins 78 and the stop 84.

In order to initiate the loading operation, it is necessary that the carrier 30 be in its fully retracted position and the normally opened switch 11LS be closed. This energizes relay 6CR. The operator of the disc grinder then pushes push button PB1 to complete a circuit through normally closed contact 16CR1, the then closed contact 6CR1 to energize a solenoind SOL A. Solenoid SOL A will then shift a valve 98 controlling the flow of hydraulic fluid relative to a pump 100 and a reservoir 101 in a manner so as to effect the extension of the fluid cylinder 88 and the tilting of the work support 73 and the workpiece W carried thereby to an upright position. The closing of the switch PB1 also results in the energization of relay 3CR and the closing of a normally opened contact 3CR1 in a holding circuit around the switch PB1 and the contact 6CR1.

At this time it is pointed out that the fluid cylinder 69 may have associated therewith a spring 102 which may resiliently resist the withdrawal of the plunger 68 so as to cushion the engagement of the workpiece W with the work positioning plate 66.

When the work support 73 reaches its upstanding position clamping the workpiece W against the work positioning plate 66, a limit switch 12LS is closed. This completes a circuit to a solenoid SOL B through a normally closed contact 5CR1 and to a solenoid SOL C through a normally closed contact 16CR2. The solenoid SOL B controls the position of a spring loaded valve 103 and when energized shifts the valve 103 to a position wherein fluid is directed from the pump 100 to the cylinder 82 in a direction to retract the piston rod 81 which results in the pins 78 being withdrawn from beneath the workpiece W and the workpiece being lowered directly onto the carrier 30. At the same time, the solenoid SOL C, which controls the position of a spring loaded valve 104, shifts the valve 104 so as to direct fluid under pressure from the pump 100 to the cylinder 69 in a direction wherein the plunger 68 is withdrawn so as to relieve the cushion pressure previously exerted thereby on the workpiece. When the pins 78 are fully retracted, a limit switch 13LS is closed. In a like manner, when the plunger 68 is fully retracted, a limit switch 14LS is automatically closed in a conventional manner. The limit switches 13LS and 14LS are connected in a series with the limit switch 12LS and control the circuit to relay 4CR which now becomes energized.

The workpiece having been properly loaded within the carrier 30, the operator of the disc grinder presses the start switch S1 which completes a circuit through the newly closed contact 4CR1 to a relay 8CR. When the relay 8CR is energized, a contact 8CR1 in a holding circuit around the switch S1 is completed. At the same time, contact 8CR2 in a circuit controlling a relay 9CR is closed, for effecting the flow of current through a normally closed stop switch SW B and a normally closed contact 7CR2. Contact 9CR1 now closes, energizing solenoid SOL G which operates to shift the position of a spring loaded valve 105 to direct fluid under pressure from the pump 100 to the left end of the cylinder 36, thereby advancing the carrier 30 and the workpiece W between the spaced apart abrasive discs 16, 17.

The carrier 30 advances the workpiece W between the abrasive discs 16, 17 until the limit switch 10LS is actuated. This results in the energization of relay 7CR and the closing of contact 7CR1 in the circuit to relay 12CR which also includes a stop switch SW A. The relay 12CR controls the feeding and positioning of the abrasive discs 16, 17 in a conventional manner which is not a part of this invention so that the abrasive discs are brought into contact with the opposite surfaces of the workpiece W to perform a grinding operation thereon so as to bring the workpiece W to the desired size.

The energization of relay 7CR also results in the opening of contact 7CR2 with the result that the relay 9CR is de-energized and contact 9CR1 is opened to de-energize solenoid SOL G. This results in the return of the valve 105 to its original position directing fluid under pressure from the pump 100 to the right end of the cylinder 36 to effect the movement of the carrier 30 towards its retracted position. However, when the carrier reaches the position where limit switch 15LS is colsed, the circuit to relay 19CR is completed and a contact 19CR1 in a bypass circuit around contact 7CR2 is closed to again energize solenoid SOL G and to shift the valve 105 to a position to effect the return movement of the carrier 30 between the abrasive discs 16 and 17.

After the workpiece has been ground to the desired size, stop switches SW A and SW B are automatically opened. This results in the resetting of the abrasive discs 16 and 17 to their spaced apart positions and the de-energization of the solenoid SOL G so as to effect the return of the carrier 30 to its initial retracted position. When the carrier 30 reaches its retracted position, limit switch 11LS is again closed, energizing relay 6CR.

The operator of the disc grinder now closes switch PB2 to complete a circuit through normally closed switch 17LS and the now closed contact 6CR2 to energize relay 5CR. The energization of relay 5CR results in the closing of contact 5CR2 in a holding circuit around switch PB2. It also results in the opening of normally closed contact 5CR1 to deenergize solenoid SOL B. The spring of the valve 103 now moves the valve to its normal position to direct fluid under pressure from the pump 100 to the cylinder 82 in a direction to extend the piston rod 81 and to project the pins 78. The pins 78 wedge in between the carrier 30 and the workpiece W to lift the workpiece W off of the carrier with the workpiece now being supported by the pins 78 and the work support 73 which carry the pins 78.

When the pins 78 are fully projected, limit switch 16LS is closed completing a circuit to relay 16CR. At this time the workpiece W is fully supported by the pins 78 and is ready for removal from the carrier 30.

When the relay 16CR is energized, normally closed contact 16CR1 opens, opening the circuit to solenoid SOL A. At the same time, normally closed contact 16CR2 opens deenergizing solenoid SOL C. As a result, the valves 98 and 104 are simultaneously returned to their positions wherein fluid under pressure is directed from the pump 100 to the cylinder 88 to effect a lowering of the work support 73 and to the cylinder 69 to project the plunger 68. Thus, as the work support 73 is being lowered, the plunger 68 is forcing the workpiece W away from the work positioning plate 66 and thus assures the removal of the workpiece W with the work support 73.

When the work support 73 reaches its lowermost position, limit switch 17LS is opened, opening the circuit to relays 5CR and 16CR, again closing the contacts 5CR1, 16CR1 and 16CR2 so as to reset the disc grinder for a repeat of the grinding operation.

At this time it is pointed out that while it is proposed to merely reciprocate the workpiece back and forth between the abrasive discs 16 and 17, it is feasible to extend the track 22 so that workpieces longer than the grinding zone may be fed completely between the abrasive discs in a reciprocating movement corresponding to the length of the workpiece.

Although only a preferred embodiment of the invention has been specifically illustrated and described herein, it is to be understood that minor variations may be made in the structure of the disc grinder without departing from the spirit and scope of the invention, as defined by the appended claims.

What is claimed as new is:

1. In a disc grinder of the type including
   (a) a bed,
   (b) a pair of abrasive discs mounted on said bed for rotation and having spaced apart opposed substantially vertically work engageable faces,
   (c) and a work carrier in the form of
      (d) a substantially vertically disposed reciprocable member for receiving a workpiece and moving with the workpiece between said abrasive discs, the improvement comprising
         (e) means for movably supporting said carrier including
            (f) an overhead track member,
            (g) said carrier being supported by said track member in suspended relation thereto and for guided movement thereon,
            (h) driving means mounted adjacent said track member,
            (i) and means connecting said carrier to said driving means for reciprocating said carrier.

2. The disc grinder of claim 1 in which said track and said driving means are supported by a pair of upstanding support members attached to said bed at the front and rear of said disc grinder.

3. The disc grinder of claim 2 wherein guide means are mounted on said front support member in position for engaging the lower portion of said carrier.

4. The disc grinder of claim 1 wherein there are guide means in position for engaging the lower portion of said carrier.

5. The disc grinder of claim 1 wherein said driving means are directly mounted on said track.

6. The disc grinder of claim 1 wherein said driving means are directly coupled to said carrier.

7. The disc grinder of claim 1 together with means to place a workpiece in said carrier comprising
   (a) a work support positioned to one side of and generally below said carrier,
   (b) and means for moving said work support to an elevated position immediately alongside said carrier to place a workpiece in said carrier.

8. The disc grinder of claim 1 together with means to place a workpiece in said carrier comprising
   (a) a work support positioned to one side of and generally below said carrier,
   (b) means for moving said work support to an elevated position immediately alongside said carrier to place a workpiece in said carrier,
   (c) and transfer means carried by said work support for transferring a workpiece from said work support to said carrier.

9. In a disc grinder of the type including
   (a) a bed,
   (b) a pair of abrasive discs mounted on said bed for rotation and having spaced apart opposed substantially vertical work engageable faces,
   (c) and a work carrier in the form of
      (d) a substantially vertically disposed reciprocable member for receiving a workpiece and moving the workpiece between said abrasive disc, the improvement comprising
         (e) a loading mechanism for placing a workpiece in said carrier and removing a ground workpiece therefrom comprising
            (f) a work support positioned to one side of and generally below said carrier,
            (g) means for moving said work support to an elevated position immediately alongside said carrier to place a workpiece in said carrier,
            (h) and transfer means carried by said work support for transferring a workpiece from said work support to said carrier.

10. The disc grinder of claim 9 wherein (a) said carrier has an opening in which a workpiece is received,
(b) and a work positioning member is disposed on the side of said carrier remote from said work support in position for cooperating with said work support to transversely position a workpiece in said carrier.

11. The disc grinder of claim 9 wherein
(a) said carrier has an opening in which a workpiece is received,
(b) a work positioning member is disposed on the side of said carrier remote from said work support in position for cooperating with said work support to transversely position a workpiece in said carrier,
(c) and means carried by said work positioning member for moving a workpiece from said carrier back onto said work support.

12. The disc grinder of claim 9 wherein said transfer means includes
(a) support members projecting from said work support in position for supporting a workpiece as a workpiece carried by said work support assumes a generally vertical position,
(b) means on said carrier for receiving said support members in partially supported relation at the time a workpiece is positioned within said carrier,
(c) and means for retracting said support members out of engagement with said carrier to seat a workpiece in said carrier.

13. The disc grinder of claim 12 wherein said support members have tapered ends to facilitate the wedging of said support members between said carrier and a workpiece to facilitate the transfer of a workpiece from said carrier to said work support.

14. The disc grinder of claim 9 wherein said loading mechanism extends beneath said carrier and projects to opposite sides thereof.

References Cited

UNITED STATES PATENTS

| | | | |
|---|---|---|---|
| 1,649,823 | 11/1927 | Gardner | 51—114 |
| 1,862,894 | 6/1932 | Hughes | 51—112 X |
| 2,246,869 | 6/1941 | Troendly | 51—215 X |
| 3,151,420 | 10/1964 | Machacek | 51—112 |

HAROLD D. WHITEHEAD, Primary Examiner

U.S. Cl. X.R.

51—215